US012367843B2

(12) United States Patent
Zhang et al.

(10) Patent No.: US 12,367,843 B2
(45) Date of Patent: Jul. 22, 2025

(54) STANDBY CONTROL SIGNAL GENERATION CIRCUIT, DISPLAY DRIVING DEVICE AND METHOD, DISPLAY APPARATUS

(71) Applicants: Beijing BOE Display Technology Co., Ltd., Beijing (CN); BOE TECHNOLOGY GROUP CO., LTD., Beijing (CN)

(72) Inventors: Jing Zhang, Beijing (CN); Jian Zhang, Beijing (CN); Yingbo Gao, Beijing (CN); Hongsheng Gu, Beijing (CN); Xiaoning Jiang, Beijing (CN); Wenyu Li, Beijing (CN); Xingliang Li, Beijing (CN); Liuyun Lv, Beijing (CN); Shuyan Ma, Beijing (CN); Yuanpei Zhao, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/290,784

(22) PCT Filed: Aug. 30, 2022

(86) PCT No.: PCT/CN2022/115736
§ 371 (c)(1),
(2) Date: Jan. 21, 2024

(87) PCT Pub. No.: WO2024/044939
PCT Pub. Date: Mar. 7, 2024

(65) Prior Publication Data
US 2025/0095597 A1 Mar. 20, 2025

(51) Int. Cl.
*G09G 3/36* (2006.01)

(52) U.S. Cl.
CPC ........... *G09G 3/36* (2013.01); *G09G 2310/08* (2013.01); *G09G 2330/026* (2013.01)

(58) Field of Classification Search
None
See application file for complete search history.

(56) References Cited

U.S. PATENT DOCUMENTS

2020/0090615 A1* 3/2020 Zhu .......................... H03M 7/30
2024/0265882 A1* 8/2024 Kozuma ................... G09F 9/30

FOREIGN PATENT DOCUMENTS

CN 102347011 A * 3/2020 ........... G09G 3/3688
CN 1977511 B * 8/2024 ............. G06F 13/00

* cited by examiner

*Primary Examiner* — Duane N Taylor, Jr.
(74) *Attorney, Agent, or Firm* — HOUTTEMAN LAW LLC

(57) ABSTRACT

The present disclosure provides a standby control signal generation circuit, including: an amplification sub-circuit connected with an input terminal of the standby control signal generation circuit and configured to receive a video signal and amplify the video signal; an XOR sub-circuit connected with the amplification sub-circuit and configured to perform an XOR operation on the amplified video signal and a ground signal; and an adjustment sub-circuit connected with the XOR sub-circuit and configured to perform a proportional adjustment on an amplitude of an output signal of the XOR sub-circuit to generate a standby control signal. The present disclosure further provides a display driving device, a display driving method and a display apparatus.

18 Claims, 3 Drawing Sheets

STANDBY CONTROL SIGNAL GENERATION CIRCUIT, DISPLAY DRIVING DEVICE AND METHOD, DISPLAY APPARATUS

TECHNICAL FIELD

The present disclosure relates to the field of display technology, in particular to a standby control signal generation circuit, a display driving device, a display driving method, and a display apparatus.

BACKGROUND

A display apparatus generally includes a display panel and a display driving device, the display driving device is used for driving the display panel to display according to display information. In order to prevent the display panel from having residual charges after the display panel is turned off, it is necessary to discharge the display panel after the display apparatus is powered off.

SUMMARY

The present disclosure provides a standby control signal generation circuit, a display driving device, a display driving method, and a display apparatus.

The present disclosure provides a standby control signal generation circuit, including: an amplification sub-circuit connected with an input terminal of the standby control signal generation circuit, and configured to receive a video signal and amplify the video signal; an Exclusive OR (XOR) sub-circuit connected with the amplification sub-circuit and configured to perform an XOR operation on the amplified video signal and a ground signal; and an adjustment sub-circuit connected with the XOR sub-circuit and configured to perform a proportional adjustment on an amplitude of an output signal of the XOR sub-circuit to generate a standby control signal.

In some implementations, the amplification sub-circuit includes an operational amplifier, a first resistor and a second resistor, a non-inverted input terminal of the operational amplifier is connected with the input terminal of the standby control signal generation circuit, an inverted input terminal of the operational amplifier is connected with a first terminal of the first resistor, a second terminal of the first resistor is connected with a ground terminal, and an output terminal of the operational amplifier is connected with the XOR sub-circuit, and two terminals of the second resistor are respectively connected with the inverted input terminal and the output terminal of the operational amplifier.

In some implementations, a ratio of a resistance of the second resistor to a resistance of the first resistor is greater than or equal to a ratio of a first threshold value to a minimum voltage of the video signal, and the first threshold value is a threshold value at which the XOR sub-circuit recognizes a high level voltage.

In some implementations, the XOR sub-circuit includes an XOR gate chip, a first input terminal of the XOR gate chip is connected with the amplification sub-circuit, a second input terminal of the XOR gate chip is connected with a ground terminal, and an output terminal of the XOR gate chip is connected with the adjustment sub-circuit.

In some implementations, the XOR sub-circuit includes: a first NOT gate unit connected with the amplification sub-circuit and configured to invert a phase of an output signal of the amplification sub-circuit; a second NOT gate unit connected with a ground terminal and configured to invert a phase of a ground signal of the ground terminal; a first AND gate unit connected with output terminals of the first NOT gate unit and the second NOT gate unit and configured to perform an AND operation on output signals of the first NOT gate unit and the second NOT gate unit; a second AND gate unit connected with the amplification sub-circuit and the ground terminal and configured to perform an AND operation on the output signal of the amplification sub-circuit and the ground signal of the ground terminal; an OR gate unit connected with output terminals of the first AND gate unit and the second AND gate unit and configured to perform an AND operation on output signals of the first AND gate unit and the second AND gate unit; and a third NOT gate unit connected with an output terminal of the OR gate unit and configured to invert a phase of an output signal of the OR gate unit.

In some implementations, the first NOT gate unit includes a fourth resistor, a fifth resistor and a first triode, the fifth resistor is connected between the output terminal of the amplification sub-circuit and a base electrode of the first triode, an emitter of the first triode is connected with the ground terminal, the fourth resistor is connected between a power supply terminal and a collector of the first triode, and a connection node between the fourth resistor and the collector of the first triode serves as the output terminal of the first NOT gate unit.

In some implementations, the second NOT gate unit includes a sixth resistor, a seventh resistor and a second triode, the seventh resistor is connected between the output terminal of the amplification sub-circuit and a base electrode of the second triode, an emitter of the second triode is connected with the ground terminal, the sixth resistor is connected between a collector of the second triode and a power supply terminal, and a connection node between the sixth resistor and the collector of the second triode serves as the output terminal of the second NOT gate unit.

In some implementations, the first AND gate unit includes an eighth resistor, a ninth resistor, a first diode and a second diode, the eighth resistor and the ninth resistor are connected in series between a power supply terminal and the ground terminal, a connection node between the eighth resistor and the ninth resistor serves as the output terminal of the first AND gate unit, an anode of the first diode is connected with the output terminal of the first AND gate unit, a cathode of the first diode is connected with the output terminal of the first NOT gate unit, an anode of the second diode is connected with the output terminal of the first AND gate unit, and a cathode of the second diode is connected with the output terminal of the second NOT gate unit.

In some implementations, the second AND gate unit includes a third diode, a fourth diode, a tenth resistor and an eleventh resistor, the tenth resistor and the eleventh resistor are connected in series between a power supply terminal and the ground terminal, a connection node between the tenth resistor and the eleventh resistor serves as the output terminal of the second AND gate unit, a cathode of the third diode is connected with the output terminal of the amplification sub-circuit, an anode of the third diode is connected with the output terminal of the second AND gate unit, a cathode of the fourth diode is connected with the ground terminal, and an anode of the fourth diode is connected with the output terminal of the second AND gate unit.

In some implementations, the OR gate unit includes a fifth diode and a sixth diode, an anode of the fifth diode is connected with the output terminal of the first AND gate unit, a cathode of the fifth diode is connected with the output terminal of the OR gate unit, an anode of the sixth diode is connected with the output terminal of the second AND gate unit, and a cathode of the sixth diode is connected with the output terminal of the OR gate unit.

In some implementations, the third NOT gate unit includes a third triode, a twelfth resistor and a thirteenth resistor, two terminals of the thirteenth resistor are respectively connected with the output terminal of the OR gate unit and a base electrode of the third triode, two terminals of the twelfth resistor are respectively connected with a power supply terminal and a collector of the third triode, an emitter of the third triode is connected with the ground terminal, and a connection node between the twelfth resistor and the collector of the third triode serves as the output terminal of the third NOT gate unit.

In some implementations, the adjustment sub-circuit includes a first divider resistor and a second divider resistor connected in series between an output terminal of the XOR sub-circuit and a ground terminal, and a connection node between the first divider resistor and the second divider resistor is connected with an output terminal of the standby control signal generation circuit.

In some implementations, the standby control signal generation circuit is configured to output the standby control signal to a display driver integrated chip, and a voltage range of a high level voltage recognized by the display driver integrated chip is recorded as from Vm to Vn, a resistance r3 of the first divider resistor and a resistance r3' of the second divider resistor satisfy:

$$Vm \leq [r3'/(r3+r3')]*Vd \leq Vn,$$

Vd is a voltage output by the XOR sub-circuit during the video signal being in a high level state.

In some implementations, the standby control signal generation circuit further includes a spare time delay sub-circuit, the spare time delay sub-circuit includes a fourteenth resistor and a capacitor, a terminal of the fourteenth resistor is floated, another terminal of the fourteenth resistor is connected with a terminal of the capacitor, and another terminal of the capacitor is connected with a ground terminal.

The present disclosure further provides a display driving device including a display driver integrated chip and the standby control signal generation circuit described above, the display driver integrated chip is configured to drive a display panel to display a corresponding video according to the video signal, and control the display panel to enter a standby stage in response to that a power supply signal is in an active state and the standby control signal is in an inactive state.

In some implementations, the display driver integrated chip being configured to control the display panel to enter the standby stage includes: the display driver integrated chip being configured to control the display panel to display a plurality of frames of a preset discharge picture in response to that the power supply signal is in the active state and the standby control signal is in the inactive state.

The present disclosure further provides a display driving method of the display driving device described above, including: by the standby control signal generation circuit, amplifying the received video signal, performing an XOR operation on the amplified video signal to generate a signal to be adjusted, and performing a proportional adjustment on an amplitude of the signal to be adjusted to generate a standby control signal; by the display driver integrated chip, driving the display panel to display the corresponding video in response to that the video signal is in an active state, and controlling the display panel to enter the standby stage in response to that the power supply signal is in the active state and the standby control signal is in the inactive state.

The present disclosure further provides a display apparatus, including: the display driving device described above, a system board and a display panel, the system board is configured to output the power supply signal in response to a power-on instruction, and output a video signal according to a content of a picture to be displayed by the display panel.

DESCRIPTION OF DRAWINGS

The accompanying drawings, which are included to provide a further understanding of the present disclosure and are incorporated in and constitute a part of this specification, illustrate embodiments of the present disclosure and together with the description serve to explain the present disclosure, but do not constitute a limitation of the present disclosure.

DETAILED DESCRIPTION

Figure 1:
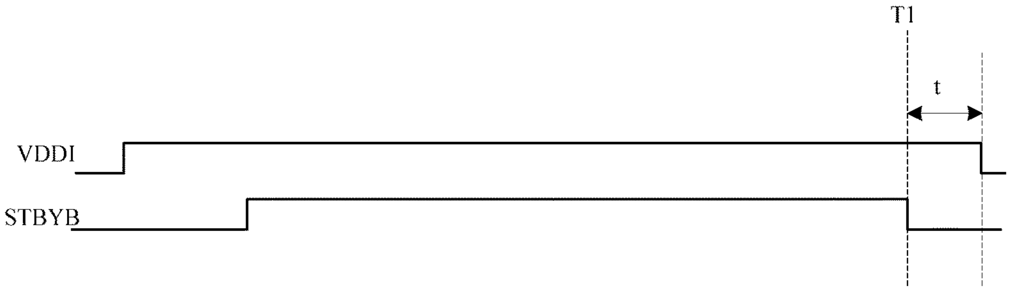
FIG. 1 is a timing diagram of a standby control signal and a power supply signal during a display apparatus being turned off.

The following detailed description of implementations of the present disclosure refers to the accompanying drawings. It should be understood that the detailed description and specific implementations, while indicating the present disclosure, are given by way of illustration and explanation only, not limitation.

To make objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few embodiments of the present disclosure, and not all embodiments. All other embodiments, which can be derived by a person skilled in the art from the described embodiments of the present disclosure without any creative effort, are within the protection scope of the present disclosure.

The terminology used herein to describe the embodiments of the present disclosure is not intended to limit and/or define the scope of the present disclosure. For example, unless otherwise defined, technical or scientific terms used herein shall have the ordinary meaning as understood by one of ordinary skill in the art to which the present disclosure belongs. It should be understood that the terms "first", "second", and the like, as used in the present disclosure, do not denote any order, quantity, or importance, but rather are used to distinguish one element from another. The singular forms "a," "an," or "the" and similar referents do not denote a limitation of quantity, but rather denote the presence of at least one, unless the context clearly dictates otherwise. The word "comprising/including" or "comprise/include", and the like, means that the element or item appearing in front of the word includes the element or item listed after the word and its equivalents, and does not exclude other elements or items. The terms "connected" or "coupled" and the like are not restricted to physical or mechanical connections, but may include electrical connections, whether direct or indirect. Terms "upper", "lower", "left", "right", and the like are used merely to indicate relative positional relationships, which may change accordingly when the absolute position of the object being described changes.

A display apparatus generally includes a display panel, a display driver integrated chip (DDIC) and a system board, the system board is configured to provide a power supply signal to the display driver integrated chip in response to receiving a power-on instruction, and provide a video input signal to the display driver integrated chip according to a content to be displayed by the display panel, the video input signal is a low-voltage differential signaling (LVDS) signal. The display driver integrated chip provides a display control signal for the display panel according to the video input signal to drive the display panel to display.

In some products, the display driver integrated chip may include a timing control circuit and a data driving circuit, the display panel is provided thereon with a gate driving circuit, the timing control circuit is configured to provide timing signals to the gate driving circuit and the data driving circuit according to the video input signal, so that the gate driving circuit provides scanning signals to pixels of the display panel row by row, and the data driving circuit provides data voltage signals to a corresponding row of pixels to enable the row of pixels to display corresponding gray scales. By adjusting a magnitude of the data voltage signal, the gray scale of the pixel can be adjusted.

In order to prevent the display panel from having residual charges after the display panel is turned off, the display panel is to be discharged after the display apparatus is powered off, so as to prevent the residual charges from affecting an image displayed by the display panel after the display panel is turned on next time. Specifically, the display driver integrated chip controls the display panel to display a discharge picture according to a STBYB signal (i.e., standby control signal), for example, if the data voltage signal supplied by the data driving circuit reaches a maximum value during the display panel displaying a white picture and reaches a minimum value during the display panel displaying a black picture, the discharge picture is a black picture.

It should be noted that controlling the display panel to display the discharge picture means that a data signal corresponding to the discharge picture is provided to the display panel.

FIG. 1 is a timing diagram of a standby control signal and a power supply signal during the display apparatus being turned off, and as shown in FIG. 1, when the display apparatus is turned off (at a time T1 in FIG. 1), the standby control signal STBYB is switched from an active level state (e.g., a high level state) to an inactive level state (e.g., a low level state), and after a time duration t elapses, the power supply signal VDD1 is switched from a high level state to a low level state. The display driver integrated chip controls the display panel to display the discharge picture in response to switching of the standby control signal STBYB from the active level state to the inactive level state.

However, in most system boards, no output pin is designed for the standby control signal STBYB, and the standby control signal STBYB cannot be provided to the display driver integrated chip, so that the display driver integrated chip cannot control the display panel to discharge as desired. In some display apparatuses, the standby control signal STBYB is generated by delaying the power supply signal VDDI, but the standby control signal STBYB thus generated is not desired, thereby causing an abnormal discharge of the display panel.

Figure 2:
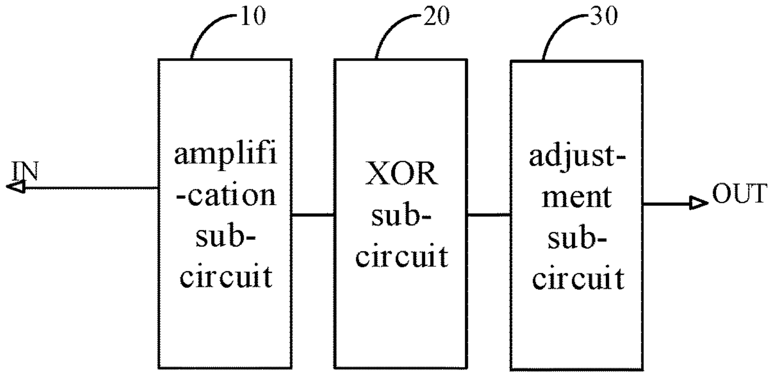
FIG. 2 is a schematic diagram of a standby control signal generation circuit according to an embodiment of the present disclosure.

FIG. 2 is a schematic diagram of a standby control signal generation circuit according to an embodiment of the present disclosure, and the standby control signal generation circuit is applied in a display driving device of a display apparatus for generating a standby control signal. As shown in FIG. 2, an input terminal IN of the standby control signal generation circuit is connected to a video signal terminal of the system board, and the video signal terminal is configured to supply a video signal. An output terminal OUT of the standby control signal generation circuit is configured to output the standby control signal. The video signal jumps from a low level state to a high level state in response to that the system board receives a power-on signal, and jumps from the high level state to the low level state in response to that the display apparatus receives a power-off signal. It should be understood that the video signal is generated by the system board according to a content of a picture to be displayed by the display panel, and thus, when the video signal is in a high level state, it does not indicate that the video signal is at a fixed potential, but the video signal may fluctuate around a preset bias voltage. The bias voltage is, for example, about 1.2V.

The standby control signal generation circuit includes an amplification sub-circuit 10, an Exclusive OR (XOR) sub-circuit 20 and an adjustment sub-circuit 30.

The amplification sub-circuit 10 is connected to the input terminal IN of the standby control signal generation circuit, and is configured to receive a video signal and amplify the video signal. The XOR sub-circuit 20 is connected to the amplification sub-circuit 10, and is configured to perform an XOR operation on the amplified video signal and a ground signal.

Since a voltage of the video signal in the high level state is relatively low and may fluctuate around the bias voltage, in a case where an input voltage of the XOR sub-circuit 20 reaches a certain threshold value, the input voltage can be recognized as a high level voltage by the XOR sub-circuit 20. Therefore, the video signal is amplified first, and then the amplified video signal is provided to the XOR sub-circuit 20, which is beneficial for the XOR sub-circuit 20 to recognize the high level state in the video signal.

An amplification factor of the amplification sub-circuit 10 may be determined according to the voltage of the video signal in the high level state, and the threshold value of the XOR sub-circuit 20 for recognizing the high level voltage. For example, the XOR sub-circuit 20 recognizes the input voltage as a high level voltage when the input voltage thereof is greater than 5V, the voltage of the video signal in the high level state fluctuates around the bias voltage of 1.2V, and the minimum voltage of the video signal is 1.1V, the amplification factor of the amplification sub-circuit 10 may be configured to be greater than or equal to 4.6.

An operation rule of the XOR sub-circuit 20 is as follows: if it is recognized that a voltage output from the amplification sub-circuit 10 is a high level voltage, an XOR operation is performed on the voltage output from the amplification sub-circuit 10 and the ground signal to output a fixed high level voltage; if it is recognized that the voltage output from the amplification sub-circuit 10 is a low level voltage, an XOR operation is performed on the voltage output from the amplification sub-circuit 10 and the ground signal to output a fixed low level voltage.

The adjustment sub-circuit 30 is connected to the XOR sub-circuit 20, and is configured to perform a proportional adjustment on an amplitude of an output signal of the XOR sub-circuit 20 to generate a standby control signal, and the standby control signal is to be output to the display driver integrated chip, so that the display driver integrated chip can control the display panel to display a preset discharge picture according to the standby control signal.

For the display driver integrated chip, only a signal with a voltage within a specific range can be recognized as a high level signal by the display driver integrated chip, and by providing the adjustment sub-circuit 30, the output voltage of the adjustment sub-circuit 30 can be adjusted, so that the display driver integrated chip can recognize the high level state and the low level state in the output voltage.

The standby control signal generation circuit provided by the embodiment of the present disclosure can perform the XOR operation on the amplified video signal and the ground signal, and generate the standby control signal by performing the proportional adjustment on the signal obtained through the XOR operation. The ground signal is always in the low level state, so that when the video signal is in the high level state, the XOR sub-circuit 20 outputs a high level signal, so that the standby control signal output by the adjustment sub-circuit 30 is in the high level state; when the video signal is in the low level state, the XOR sub-circuit 20 outputs a low level signal, so that the standby control signal output from the adjustment sub-circuit 30 is in the low level state. Upon receiving a power-off instruction, the system board switches the video signal from the high level state to the low level state first, and switches, after a time duration elapses, the power supply voltage from the high level state to the low level state, so that when the display apparatus is turned off, the standby control signal generated by the standby control signal generation circuit is switched to the low level state earlier than the power supply voltage, and the display driver integrated chip can control the display panel to display a preset discharge picture in response to switching of the standby control signal before the power supply voltage is shut down, thereby ensuring a normal discharge of the display panel.

Figure 3:
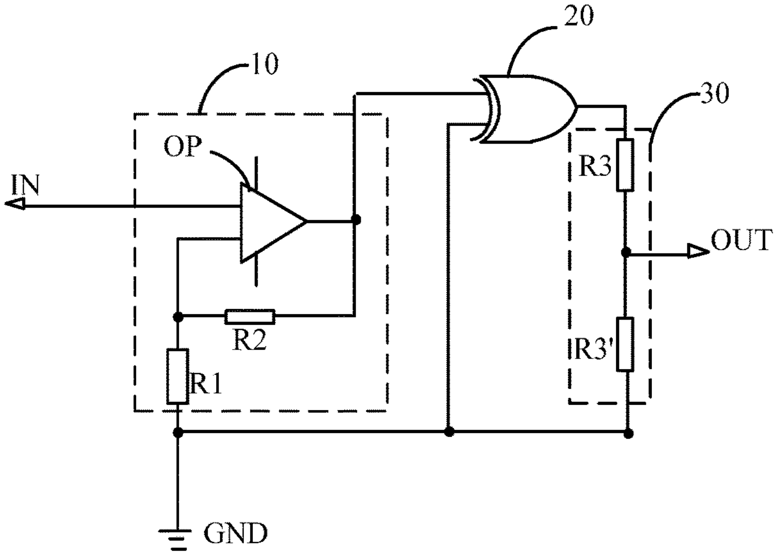
FIG. 3 is a schematic diagram of a standby control signal generation circuit according to an embodiment of the present disclosure.

FIG. 3 is a schematic diagram of a standby control signal generation circuit according to an embodiment of the present disclosure, and FIG. 3 illustrates a specific implementation of FIG. 2, and as shown in FIG. 3, the amplification sub-circuit 10 includes an operational amplifier OP, a first resistor R1 and a second resistor R2.

A non-inverted input terminal of the operational amplifier OP is connected to an input terminal of the standby control generation circuit, an inverted input terminal of the operational amplifier OP is connected to a first terminal of the first resistor R1, a second terminal of the first resistor R1 is connected to a ground terminal GND, and an output terminal of the operational amplifier OP is connected to the XOR sub-circuit 20. Two terminals of the second resistor R2 are connected to the inverted input terminal and the output terminal of the operational amplifier OP, respectively.

An amplification factor of the operational amplifier OP is r2/r1, r2 is a resistance of the second resistor R2, and r1 is a resistance of the first resistor R1. Here, the amplification factor of the operational amplifier OP may be determined according to the bias voltage of the video signal and the threshold value of a voltage to be recognized as the high level voltage by the XOR sub-circuit 20, so that resistances of the first resistor R1 and the second resistor R2 are set according to the amplification factor.

In an example, the minimum voltage of the video signal is 1.1V, and the threshold value of the voltage to be recognized as the high level voltage by the XOR sub-circuit 20 is 5V, and in this case, the ratio r2/r1 is set to 4.7, the specific resistances of the first resistor R1 and the second resistor R2 each may be determined according to a desired current, for example, the resistance of the first resistor R1 is set to 1KΩ, and the resistance of the second resistor R2 is set to 4.7KΩ.

In some implementations, the XOR sub-circuit 20 may be an XOR gate chip, a first input terminal of the XOR gate chip is connected to the amplification sub-circuit 10, a second input terminal of the XOR gate chip is grounded, and an output terminal of the XOR gate chip is connected to the adjustment sub-circuit 30. Illustratively, the XOR gate chip is, for example, a 74LS86 chip.

In some implementations, as shown in FIG. 3, the adjustment sub-circuit 30 includes first and second divider resistors R3 and R3' connected in series between the output terminal of the XOR sub-circuit 20 and the ground terminal GND, and a connection node between the first and second divider resistors R3 and R3' serves as the output terminal of the adjustment sub-circuit 30 to be connected to the output terminal OUT of the standby control signal generation circuit, so that a voltage at the connection node is output to the display driver integrated chip.

In some implementations, when the video signal is in a high level state, the voltage output by the XOR sub-circuit 20 is denoted as Vd, and the voltage output by the adjustment sub-circuit 30 is Vb=[r3'/(r3+r3')]*Vd, r3 is a resistance of the first divider resistor R3, and r3' is a resistance of the second divider resistor R3'. The adjustment proportion (i.e., proportion to be adjusted) of the adjustment sub-circuit 30 may be determined according to Vd and a range of the high level signal to be recognized by the display driver integrated chip, so that the resistances of the first divider resistor R3 and the second divider resistor R3' can be set according to the adjustment proportion. That is, assuming that the display driver integrated chip recognizes the high level voltage in the voltage range from Vm to Vn, r3 and r3' satisfy:

$$Vm \le [r3'/(r3+r3')]*Vd \le Vn.$$

Figure 4:
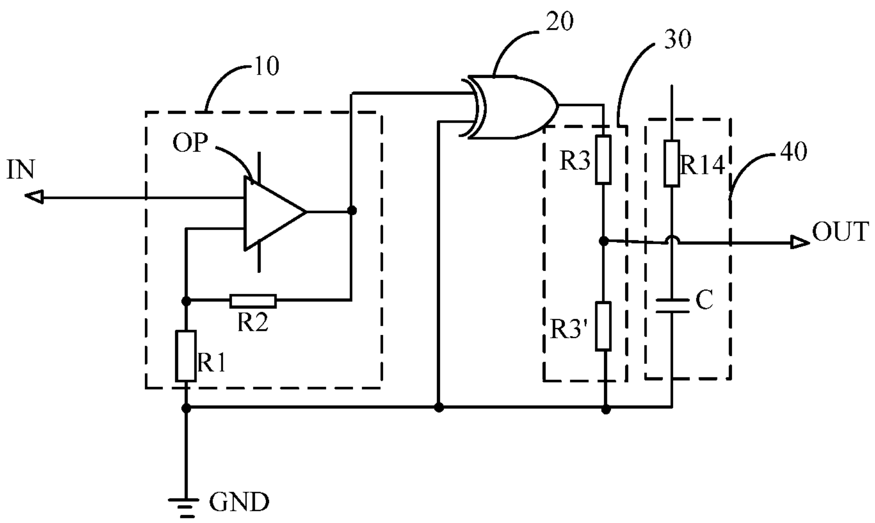
FIG. 4 is a schematic diagram of a standby control signal generation circuit according to an embodiment of the present disclosure.

FIG. 4 is a schematic diagram of a standby control signal generation circuit according to an embodiment of the present disclosure, and in some implementations, as shown in FIG. 4, the standby control signal generation circuit may further include a spare time delay sub-circuit 40, the spare time delay sub-circuit 40 may be an RC delay circuit, and includes a fourteenth resistor R14 and a capacitor C, a terminal of the fourteenth resistor R14 is floated, another terminal of the fourteenth resistor R14 is connected to a terminal of the capacitor C, and another terminal of the capacitor C is connected to the ground terminal GND.

The standby control signal generation circuit may be integrated into a driving circuit board, and the fourteenth resistor R14 and the capacitor C may be devices reserved on the driving circuit board. In an actual production process, after the amplification sub-circuit 10, the XOR sub-circuit 20 and the adjustment sub-circuit 30 are manufactured, a signal test may be performed, if a fault occurs in the amplification sub-circuit 10, the XOR sub-circuit 20 and/or the adjustment sub-circuit 30 and a desired standby control signal cannot be generated finally, the fourteenth resistor R14 may be connected with a power supply terminal VDD, so that a connection node between the fourteenth resistor R14 and the capacitor C serves as an output terminal OUT of the standby control signal generation circuit to be connected with the display driver integrated chip, and thus, a signal of the power supply terminal VDD is delayed by the RC delay circuit to generate the standby control signal.

Figure 5:
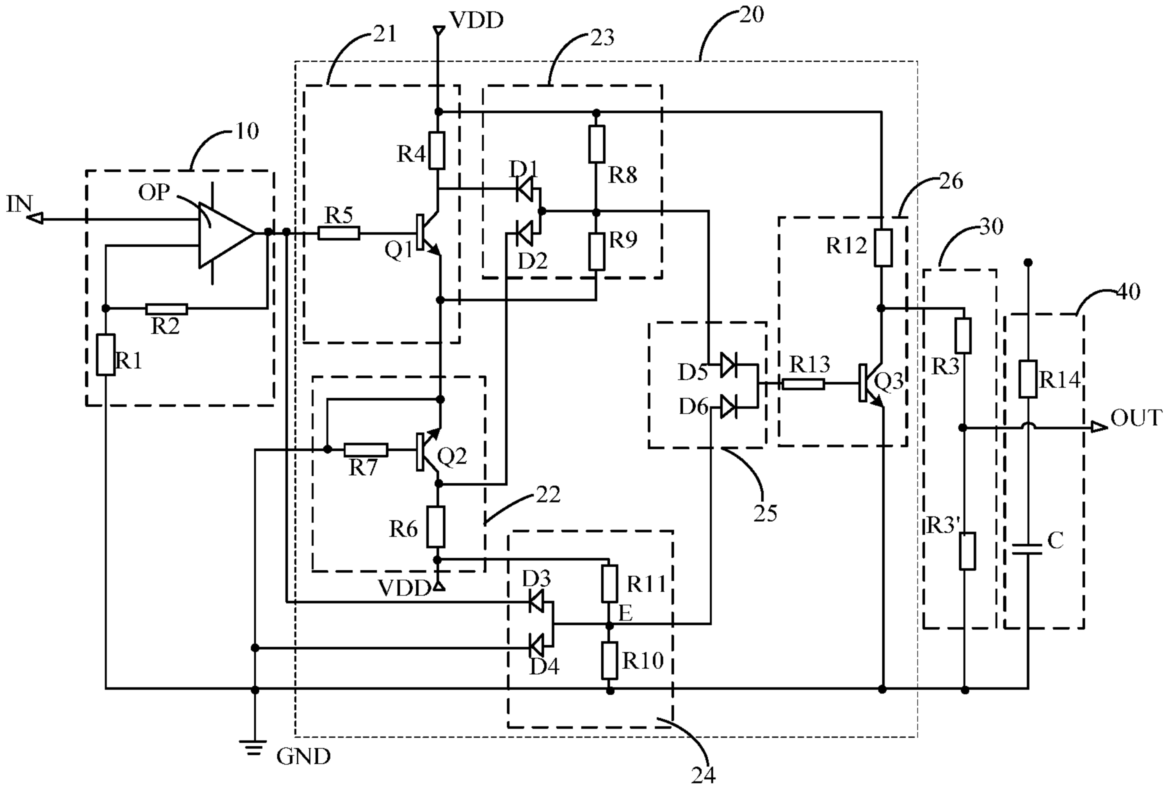
FIG. 5 is a schematic diagram of a standby control signal generation circuit according to an embodiment of the present disclosure.

FIG. 5 is a schematic diagram of a standby control signal generation circuit according to an embodiment of the present disclosure, and in FIG. 5, structures of the amplification sub-circuit 10 and the adjustment sub-circuit 30 are the same as those in FIG. 3, and are not described again here.

In FIG. 5, the XOR sub-circuit 20 specifically includes a first NOT gate unit 21, a second NOT gate unit 22, a first AND gate unit 23, a second AND gate unit 24, an OR gate unit 25, and a third NOT gate unit 26.

The first NOT gate unit 21 is connected to the amplification sub-circuit 10, and is configured to invert a phase of an output signal of the amplification sub-circuit 10.

The second NOT gate unit 22 is connected to the ground terminal GND, and is configured to invert a phase of a ground signal of the ground terminal GND.

The first AND gate unit 23 is connected to an output terminal of the first NOT gate unit 21 and an output terminal of the second NOT gate unit 22, and is configured to perform an AND operation on an output signal of the first NOT gate unit 21 and an output signal of the second NOT gate unit 22.

The second AND gate unit 24 is connected to the amplification sub-circuit 10 and the ground terminal GND, and is configured to perform an AND operation on the output signal of the amplification sub-circuit 10 and the ground signal of the ground terminal GND.

The OR gate unit 25 is connected to an output terminal of the first AND gate unit 23 and an output terminal of the second AND gate unit 24, and is configured to perform an AND operation on an output signal of the first AND gate unit 23 and an output signal of the second AND gate unit 24.

The third NOT gate unit 26 is connected to an output terminal of the OR gate unit 25 to invert a phase of an output signal of the OR gate unit 25.

If the amplification sub-circuit 10 outputs a high level signal, the first NOT gate unit 21 outputs a low level signal, the second NOT gate unit 22 outputs a high level signal, the first AND gate unit 23 performs an AND operation on the low level signal output by the first NOT gate unit 21 and the high level signal output by the second NOT gate unit 22 to output a low level signal, and the second AND gate unit 24 performs an AND operation on the high level signal output by the amplification sub-circuit 10 and a low level signal of the ground terminal GND to output a low level signal, the OR gate unit 25 performs an OR operation on the low level signal output from the first AND gate unit 23 and the low level signal output from the second AND gate unit 24 to output a low level signal, and the third NOT gate unit 26 inverts a phase of the low level signal output from the OR gate unit 25 to output a high level signal.

If the amplification sub-circuit 10 outputs a low level signal, the first NOT gate unit 21 outputs a high level signal, the second NOT gate unit 22 outputs a high level signal, the first AND gate unit 23 performs an AND operation on the high level signal output by the first NOT gate unit 21 and the high level signal output by the second NOT gate unit 22 to output a high level signal, the second AND gate unit 24 performs an AND operation on the low level signal output by the amplification sub-circuit 10 and the low level signal of the ground terminal GND to output a low level signal, the OR gate unit 25 performs an OR operation on the high level signal output by the first AND gate unit 23 and the low level signal output by the second AND gate unit 24 to output a high level signal, and the third NOT gate unit 26 inverts a phase of the high level signal output from the OR gate unit 25 to output a low level signal.

In some implementations, as shown in FIG. 5, the first NOT gate unit 21 includes a fourth resistor R4, a fifth resistor R5 and a first triode Q1, the fourth resistor R4 is connected between the power supply terminal VDD and a collector of the first triode Q1, the fifth resistor R5 is connected between the output terminal of the amplification sub-circuit 10 and a base electrode of the first triode Q1, an emitter of the first triode Q1 is connected to the ground terminal GND, and a connection node between the fourth resistor R4 and the collector of the first triode Q1 serves as the output terminal of the first NOT gate unit 21.

The fourth resistor R4 is a gate resistor of the first triode Q1, and a voltage may be provided to the output terminal of the first NOT gate unit 21 through the fourth resistor R4. When the first triode Q1 is turned on in a saturated state, a relatively large voltage drops across the fourth resistor R4, so that a potential of the collector of the first triode Q1 is almost equal to a potential of the emitter of the first triode Q1; when the first triode Q1 is turned off, a voltage of the power supply terminal VDD is applied to the collector of the first triode Q1 through the fourth resistor R4, so that the voltage of the collector of the first triode Q1 is equal to the voltage of the power supply terminal VDD. The fifth resistor R5 is an input resistor of the first triode Q1, and a forward bias current may be applied to the first triode Q1 through the fifth resistor R5.

If an input terminal of the first NOT gate unit 21 (i.e., the output terminal of the amplification sub-circuit 10) receives a low level signal, since the base electrode of the first triode Q1 cannot receive a forward bias current and therefore the first triode Q1 is turned off, so that no collector current passes through the first triode Q1, and no voltage drops across the fourth resistor R4, and the output terminal of the first NOT gate unit 21 outputs a voltage signal of the power supply terminal VDD, i.e., a high level signal.

If the input terminal of the first NOT gate unit 21 (i.e., the output terminal of the amplification sub-circuit 10) receives a high level signal, the high level signal is applied to the base electrode of the first triode Q1 through the fifth resistor R5 to provide a forward bias current to the base electrode, so that the first triode Q1 is turned on in a saturated state, and in this case, a relatively large voltage drops across the fourth resistor R4, so that a voltage at the output terminal of the first NOT gate unit 21 reaches a low level.

As shown in FIG. 5, the second NOT gate unit 22 includes a sixth resistor R6, a seventh resistor R7 and a second triode Q2, the sixth resistor R6 is connected between a collector of the second triode Q2 and the power supply terminal VDD, the seventh resistor R7 is connected between the output terminal of the amplification sub-circuit 10 and a base electrode of the second triode Q2, and an emitter of the second triode Q2 is connected with the ground terminal GND. A connection node between the sixth resistor R6 and the collector of the second triode Q2 serves as the output terminal of the second NOT gate unit 22.

An operation principle of the second NOT gate unit 22 is the same as that of the first NOT gate unit 21, and is not described herein.

As shown in FIG. 5, the first AND gate unit 23 includes a first diode D1, a second diode D2, an eighth resistor R8 and a ninth resistor R9.

The eighth resistor R8 and the ninth resistor R9 are connected in series between the power supply terminal VDD and the ground terminal GND, specifically, a terminal of the eighth resistor R8 is connected to the power supply terminal VDD, another terminal of the eighth resistor R8 is connected to a terminal of the ninth resistor R9, and another terminal of the ninth resistor R9 is connected to the ground terminal GND. A connection node between the eighth resistor R8 and the ninth resistor R9 serves as the output terminal of the first AND gate unit 23. An anode of the first diode D1 is connected to the output terminal of the first AND gate unit 23, and a cathode of the first diode D1 is connected to the output terminal of the first NOT gate unit 21. An anode of the second diode D2 is connected to the output terminal of the first AND gate unit 23, and a cathode of the first diode D1 is connected to the output terminal of the second NOT gate unit 22.

Taking the voltage of the first power supply terminal VDD being equal to 5V, and resistances of the eighth resistor R8 and the ninth resistor R9 both being equal to 1KΩ as an example, after the voltage of 5V is divided by the eighth resistor R8 and the ninth resistor R9, the voltage at the connection node E between the eighth resistor R8 and the ninth resistor R9 is 2.5V. If the cathode of the first diode D1 and the cathode of the second diode D2 are simultaneously input with a low level signal, e.g., a signal of 0V, the first diode D1 and the second diode D2 are both turned on, and the voltage at the connection node E drops to a low level, that is, if the cathode of the first diode D1 and the cathode of the second diode D2 are simultaneously input with a low level signal, the first AND gate unit 23 outputs a low level signal. If the cathode of the first diode D1 is input with a low level signal, e.g., a signal of 0V, a high level signal, e.g., a signal of 5V, is input into the cathode of the second diode D2, the first diode D1 is turned on, and the voltage at the connection node E drops to a low level, so that the second diode D2 is turned off. That is, if the cathode of the first diode D1 is input with a low level signal and the cathode of the second diode D2 is input with a high level signal, the first AND gate unit 23 outputs a low level signal. If the cathode of the first diode D1 is input with a high level signal and the cathode of the second diode D2 is input with a low level signal, the first diode D1 is turned off, the second diode D2 is turned on, and the output terminal of the first AND gate unit 23 (i.e., at the connection node E) outputs a low level signal. If the cathode of the first diode D1 and the cathode of the second diode D2 both are input with a high level signal (e.g., a signal of 5V), both the first diode D1 and the second diode D2 are turned off, and the output terminal of the first AND gate unit 23 (i.e., at the connection node E) outputs a high level signal (i.e., the signal of 2.5V described above).

As shown in FIG. 5, the second AND gate unit 24 includes a third diode D3, a fourth diode D4, a tenth resistor R10 and an eleventh resistor R11.

The tenth resistor R10 and the eleventh resistor R11 are connected in series between the power supply terminal VDD and the ground terminal GND, and specifically, a terminal of the tenth resistor R10 is connected to the power supply terminal VDD, another terminal of the tenth resistor R10 is connected to a terminal of the eleventh resistor R11, and another terminal of the eleventh resistor R11 is connected to the ground terminal GND. A connection node between the tenth resistor R10 and the eleventh resistor R11 serves as the output terminal of the second AND gate unit 24, a cathode of the third diode D3 is connected to the output terminal of the amplification sub-circuit 10, an anode of the third diode D3 is connected to the output terminal of the second AND gate unit 24, a cathode of the fourth diode D4 is connected to the ground terminal GND, and an anode of the fourth diode D4 is connected to the output terminal of the second AND gate unit 24.

An operation principle of the second AND gate unit 24 is the same as that of the first AND gate unit 23, and will not be described herein.

As shown in FIG. 5, the OR gate unit 25 includes a fifth diode D5 and a sixth diode D6, an anode of the fifth diode D5 is connected to the output terminal of the first AND gate unit 23, a cathode of the fifth diode D5 is connected to the output terminal of the OR gate unit 25, an anode of the sixth diode D6 is connected to the output terminal of the second AND gate unit 24, and a cathode of the sixth diode D6 is connected to the output terminal of the OR gate unit 25.

If the anode of at least one of the fifth diode D5 or the sixth diode D6 receives a high level signal, at least one of the fifth diode D5 or the sixth diode D6 is turned on, so that the output terminal of the OR gate unit 25 outputs a high level signal. If the anode of the fifth diode D5 and the anode of the sixth diode D6 both receive a low level signal, both the fifth diode D5 and the sixth diode D6 are turned off, and the output terminal of the OR gate unit 25 outputs a low level signal.

As shown in FIG. 5, the third NOT gate unit 26 includes a third triode Q3, a twelfth resistor R12 and a thirteenth resistor R13.

Two terminals of the thirteenth resistor R13 are respectively connected to the output terminal of the OR gate unit 25 and a base electrode of the third triode Q3. Two terminals of the twelfth resistor R12 are respectively connected to the power supply terminal VDD and a collector of the third triode Q3, and an emitter of the third triode Q3 is connected to the ground terminal GND. A connection node between the twelfth resistor R12 and the collector of the third triode Q3 serves as the output terminal of the third NOT gate unit 26.

An operation principle of the third NOT gate unit 26 is the same as that of the first NOT gate unit 21 and the second NOT gate unit 22, and the description thereof is omitted.

Figure 6:
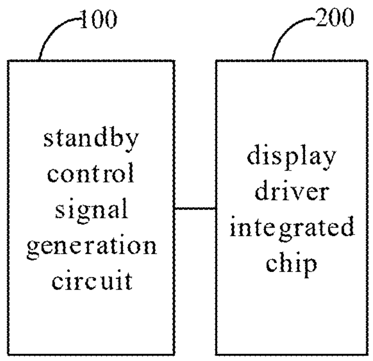
FIG. 6 is a schematic diagram of a display driving device according to an embodiment of the present disclosure.

FIG. 6 is a schematic diagram of a display driving device according to an embodiment of the present disclosure, and as shown in FIG. 6, the display driving device includes a display driver integrated chip 200 and the standby control signal generation circuit 100 in the above embodiment.

The display driver integrated chip 200 is configured to drive a display panel to display a corresponding video according to the video signal, and control the display panel to enter a standby stage in response to that the power supply signal is in an active state and the standby control signal is in an inactive state.

In the embodiment of the present disclosure, the active state and inactive state are relative terms, the active state of the video signal refers to a state that the video signal carries image information, so that the display panel can be driven to display an image, the power supply signal may be regarded as a power source for driving the display panel and the display driving device to operate, the active state of the power supply signal refers to a state of the power supply signal having a certain voltage capable of driving the display panel and the display driving device to operate. In the embodiment of the present disclosure, the active state of the video signal and the active state of the power supply signal are states in which the video signal and the power supply signal are at a high level, and correspondingly, the inactive state of the video signal and the inactive state of the power supply signal are states in which the video signal and the power supply signal are at a low level. Since the standby control signal is generated by amplifying, performing an XOR operation on, and scaling (i.e., performing the proportional adjustment on) the video signal, the active state of the standby control signal is also a state in which the standby control signal is at a high level, and the inactive state is a state in which the standby control signal is at a low state.

In some implementations, the display driver integrated chip 200 being configured to control the display panel to enter the standby stage may specifically include: the display driver integrated chip 200 being configured to control the display panel to display a plurality of frames of a preset discharge picture. That is, a data signal corresponding to the preset discharge picture is provided for the display panel.

For example, the preset discharge picture is a black picture, and before the display panel is turned off, if a voltage of a data signal for displaying the black picture by the display panel being normally displaying, is Vd1, and for controlling the display panel to enter the standby stage, the data signal with a voltage of Vd1 is provided for the display panel.

An embodiment of the present disclosure further provides a display driving method of the display driving device described above, including: by the standby control signal generation circuit, amplifying a received video signal, performing an XOR operation on the amplified video signal to generate a signal to be adjusted, and performing a proportional adjustment on the signal to be adjusted to generate a standby control signal; by the display driver integrated chip, driving the display panel to display a corresponding video in response to that the video signal is in an active state, and controlling the display panel to enter a standby stage in response to that the power supply signal is in an active state and the standby control signal is in an inactive state.

The controlling the display panel to enter the standby stage may specifically include: controlling the display panel to display a preset discharge picture, for example, a black picture.

Figure 7:
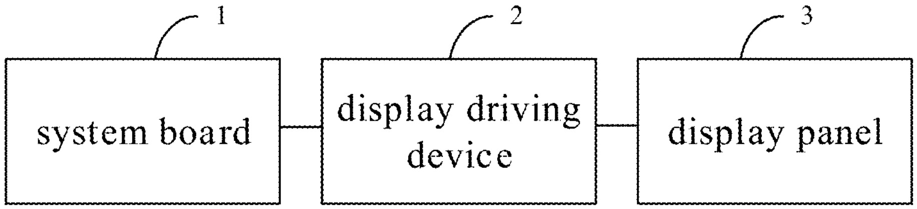
FIG. 7 is a schematic diagram of a display apparatus according to an embodiment of the present disclosure.

FIG. 7 is a schematic diagram of a display apparatus according to an embodiment of the present disclosure, as shown in FIG. 7, the display apparatus includes a system board 1, a display panel 3, and the display driving device 2 as described above.

The system board 1 is configured to output a power supply signal in response to a power-on instruction and output a video signal according to a content of a picture to be displayed on the display panel.

The display driving device 2 generates a standby control signal based on the video signal output from the system board 1, drives the display panel to display a corresponding video according to a voltage of the video signal in an active state, and controls the display panel to enter a standby stage in response to that the power supply signal is in an active state and the standby control signal is in an inactive state.

The display panel 3 is a liquid crystal display panel, and the display apparatus further includes a backlight source for providing backlight for the display panel. The system board 1 may control on and off of the backlight source.

Figure 8:
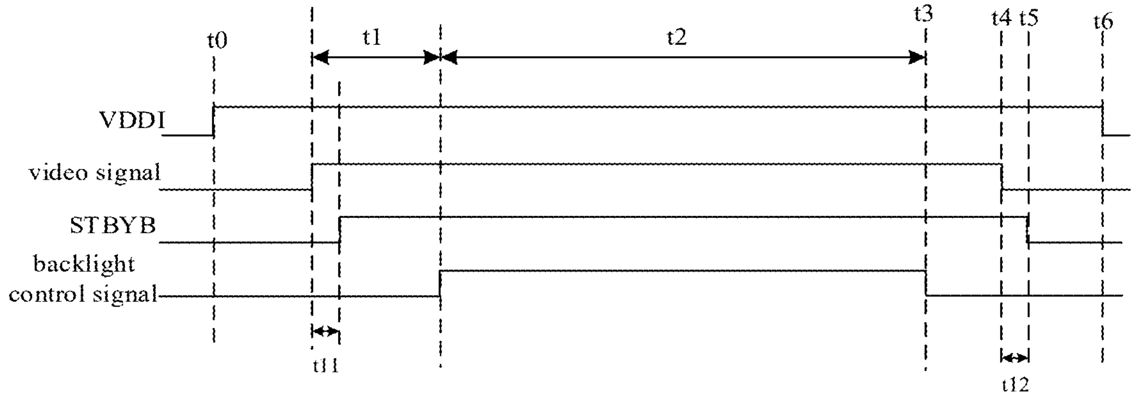
FIG. 8 is a timing diagram of an operation of a display apparatus according to an embodiment of the present disclosure.

FIG. 8 is a timing diagram of an operation of a display apparatus according to an embodiment of the present disclosure, and as shown in FIG. 8, at a time to, the system board 1 receives a power-on signal, and thus starts to output the power supply signal at a high level.

In a period t1 (i.e., an initialization period) after the time to, the system board 1 outputs a video signal at a high level, and a magnitude of the video signal is at a preset initialization voltage.

In a period t2 (i.e., a normal display period), the system board 1 continues to output the video signal at the high level according to the content of the picture to be displayed on the display panel 3, and the display driver integrated chip 2 drives the display panel to display according to the video signal. Moreover, the system board 1 outputs a backlight control signal in an active state to control the backlight source to emit light. The display driver integrated chip 2 driving the display panel to display according to the video signal means that the display driver integrated chip 2 writes a corresponding data voltage into each pixel of the display panel 3 according to the video signal, so that liquid crystal molecules in each pixel are deflected to adjust brightness of light transmitted through the pixel.

At a time t3, the system board 1 outputs a backlight control signal in an inactive state in response to a power-off instruction, thereby controlling the backlight source to stop emitting light.

At a time t4, the system board 1 stops outputting the video signal.

In addition, the standby control signal generation circuit generates the standby control signal based on the video signal, since any electronic device itself has a certain delay effect on a signal, there is a certain time difference between a rising edge of the standby control signal and a rising edge of the video signal, as well as between a falling edge of the standby control signal and a falling edge of the video signal, as shown at t11 and t12 in FIG. 8.

After a time t5 (the falling edge of the standby control signal) and before a time t6 (the falling edge of the power supply signal), the display driver integrated chip 2 drives the display panel to display a plurality of frames of a preset discharge picture (e.g., 5 or 6 frames or other number of frames of the preset discharge picture).

It will be understood that the above embodiments are merely exemplary embodiments employed to illustrate the principles of the present disclosure, and the present disclosure is not limited thereto. It will be apparent to those skilled in the art that various changes and modifications may be made without departing from the spirit and scope of the present disclosure, and these changes and modifications are to be considered within the scope of the present disclosure.

The invention claimed is:

1. A standby control signal generation circuit, comprising:

an amplification sub-circuit connected with an input terminal of the standby control signal generation circuit, and configured to receive a video signal and amplify the video signal;

an Exclusive OR (XOR) sub-circuit connected with the amplification sub-circuit and configured to perform an XOR operation on the amplified video signal and a ground signal; and an adjustment sub-circuit connected with the XOR sub-circuit and configured to perform a proportional adjustment on an amplitude of an output signal of the XOR sub-circuit to generate a standby control signal.

2. The standby control signal generation circuit of claim 1, wherein the amplification sub-circuit comprises an operational amplifier, a first resistor and a second resistor, a non-inverted input terminal of the operational amplifier is connected with the input terminal of the standby control signal generation circuit, an inverted input terminal of the operational amplifier is connected with a first terminal of the first resistor, a second terminal of the first resistor is connected with a ground terminal, and an output terminal of the operational amplifier is connected with the XOR sub-circuit, and two terminals of the second resistor are respectively connected with the inverted input terminal and the output terminal of the operational amplifier.

3. The standby control signal generation circuit of claim 2, wherein a ratio of a resistance of the second resistor to a resistance of the first resistor is greater than or equal to a ratio of a first threshold value to a minimum voltage of the video signal, and the first threshold value is a threshold value at which the XOR sub-circuit recognizes a high level voltage.

4. The standby control signal generation circuit of claim 1, wherein the XOR sub-circuit comprises an XOR gate chip, a first input terminal of the XOR gate chip is connected with the amplification sub-circuit, a second input terminal of the XOR gate chip is connected with a ground terminal, and an output terminal of the XOR gate chip is connected with the adjustment sub-circuit.

5. The standby control signal generation circuit of claim 1, wherein the XOR sub-circuit comprises:

a first NOT gate unit connected with the amplification sub-circuit and configured to invert a phase of an output signal of the amplification sub-circuit;

a second NOT gate unit connected with a ground terminal and configured to invert a phase of a ground signal of the ground terminal;

a first AND gate unit connected with output terminals of the first NOT gate unit and the second NOT gate unit and configured to perform an AND operation on output signals of the first NOT gate unit and the second NOT gate unit;

a second AND gate unit connected with the amplification sub-circuit and the ground terminal and configured to perform an AND operation on the output signal of the amplification sub-circuit and the ground signal of the ground terminal;

an OR gate unit connected with output terminals of the first AND gate unit and the second AND gate unit and configured to perform an AND operation on output signals of the first AND gate unit and the second AND gate unit; and a third NOT gate unit connected with an output terminal of the OR gate unit and configured to invert a phase of an output signal of the OR gate unit.

6. The standby control signal generation circuit of claim 5, wherein the first NOT gate unit comprises a fourth resistor, a fifth resistor and a first triode, the fifth resistor is connected between the output terminal of the amplification sub-circuit and a base electrode of the first triode, an emitter of the first triode is connected with the ground terminal, the fourth resistor is connected between a power supply terminal and a collector of the first triode, and a connection node between the fourth resistor and the collector of the first triode serves as the output terminal of the first NOT gate unit.

7. The standby control signal generation circuit of claim 5, wherein the second NOT gate unit comprises a sixth resistor, a seventh resistor and a second triode, the seventh resistor is connected between the output terminal of the amplification sub-circuit and a base electrode of the second triode, an emitter of the second triode is connected with the ground terminal, the sixth resistor is connected between a collector of the second triode and a power supply terminal, and a connection node between the sixth resistor and the collector of the second triode serves as the output terminal of the second NOT gate unit.

8. The standby control signal generation circuit of claim 5, wherein the first AND gate unit comprises an eighth resistor, a ninth resistor, a first diode and a second diode, the eighth resistor and the ninth resistor are connected in series between a power supply terminal and the ground terminal, and a connection node between the eighth resistor and the ninth resistor serves as the output terminal of the first AND gate unit, an anode of the first diode is connected with the output terminal of the first AND gate unit, a cathode of the first diode is connected with the output terminal of the first NOT gate unit, an anode of the second diode is connected with the output terminal of the first AND gate unit, and a cathode of the second diode is connected with the output terminal of the second NOT gate unit.

9. The standby control signal generation circuit of claim 5, wherein the second AND gate unit comprises a third diode, a fourth diode, a tenth resistor and an eleventh resistor, the tenth resistor and the eleventh resistor are connected in series between a power supply terminal and the ground terminal, and a connection node between the tenth resistor and the eleventh resistor serves as the output terminal of the second AND gate unit, a cathode of the third diode is connected with the output terminal of the amplification sub-circuit, an anode of the third diode is connected with the output terminal of the second AND gate unit, a cathode of the fourth diode is connected with the ground terminal, and an anode of the fourth diode is connected with the output terminal of the second AND gate unit.

10. The standby control signal generation circuit of claim 5, wherein the OR gate unit comprises a fifth diode and a sixth diode, an anode of the fifth diode is connected with the output terminal of the first AND gate unit, a cathode of the fifth diode is connected with the output terminal of the OR gate unit, an anode of the sixth diode is connected with the output terminal of the second AND gate unit, and a cathode of the sixth diode is connected with the output terminal of the OR gate unit.

11. The standby control signal generation circuit of claim 5, wherein the third NOT gate unit comprises a third triode, a twelfth resistor and a thirteenth resistor, two terminals of the thirteenth resistor are respectively connected with the output terminal of the OR gate unit and a base electrode of the third triode, two terminals of the twelfth resistor are respectively connected with a power supply terminal and a collector of the third triode, an emitter of the third triode is connected with the ground terminal, and a connection node between the twelfth resistor and the collector of the third triode serves as the output terminal of the third NOT gate unit.

12. The standby control signal generation circuit of claim 1, wherein the adjustment sub-circuit comprises a first divider resistor and a second divider resistor connected in series between an output terminal of the XOR sub-circuit and a ground terminal, and a connection node between the first divider resistor and the second divider resistor is connected with an output terminal of the standby control signal generation circuit.

13. The standby control signal generation circuit of claim 12, wherein the standby control signal generation circuit is configured to output the standby control signal to a display driver integrated chip, and a voltage range of a high level voltage recognized by the display driver integrated chip is recorded as from Vm to Vn, a resistance r3 of the first divider resistor and a resistance r3' of the second divider resistor satisfy:

$$Vm \leq \left[r3'/(r3+r3')\right]*Vd \leq Vn,$$

wherein, Vd is a voltage output by the XOR sub-circuit during the video signal being in a high level state.

14. The standby control signal generation circuit of claim 1, further comprising a spare time delay sub-circuit, wherein the spare time delay sub-circuit comprises a fourteenth resistor and a capacitor, a terminal of the fourteenth resistor is floated, another terminal of the fourteenth resistor is connected with a terminal of the capacitor, and another terminal of the capacitor is connected with a ground terminal.

15. A display driving device, comprising a display driver integrated chip and the standby control signal generation circuit of claim 1, the display driver integrated chip is configured to drive a display panel to display a corresponding video according to the video signal, and control the display panel to enter a standby stage in response to that a power supply signal is in an active state and the standby control signal is in an inactive state.

16. The display driving device of claim 15, wherein the display driver integrated chip being configured to control the display panel to enter the standby stage comprises:

the display driver integrated chip being configured to control the display panel to display a plurality of frames of a preset discharge picture.

17. A display driving method of the display driving device of claim 15, comprising:

by the standby control signal generation circuit, amplifying the received video signal, performing an XOR operation on the amplified video signal to generate a signal to be adjusted, and performing a proportional adjustment on an amplitude of the signal to be adjusted to generate a standby control signal;

by the display driver integrated chip, driving the display panel to display the corresponding video in response to that the video signal is in an active state, and controlling the display panel to enter the standby stage in response to that the power supply signal is in the active state and the standby control signal is in the inactive state.

18. A display apparatus, comprising: the display driving device of claim 15, a system board and a display panel, wherein the system board is configured to output the power supply signal in response to a power-on instruction, and output a video signal according to a content of a picture to be displayed by the display panel.

* * * * *